United States Patent

Schmidt et al.

[11] Patent Number: 5,804,658
[45] Date of Patent: Sep. 8, 1998

[54] PROCESS FOR PRODUCING COMPOSITE ARTICLE MADE OF POLYESTERS AND ELASTOMERS

[75] Inventors: Friedrich Georg Schmidt; Horst Heuer, both of Haltern, Germany

[73] Assignee: Huels Aktiengesellschaft, Marl, Germany

[21] Appl. No.: 728,993

[22] Filed: Oct. 11, 1996

[30] Foreign Application Priority Data

Oct. 20, 1995 [DE] Germany .................. 195 39 127.6

[51] Int. Cl.$^6$ ...................................... C08L 67/00
[52] U.S. Cl. .................. 525/168; 525/169; 525/170; 525/171; 525/177
[58] Field of Search ................... 525/177, 168, 525/169, 170, 171

[56] References Cited

U.S. PATENT DOCUMENTS 5,102,489  4/1992  Grosse-Puppendahl et al. .
5,552,460  9/1996  Schmidt et al. .

Primary Examiner—Edward J. Cain
Attorney, Agent, or Firm—Oblon, Spivak, McClelland, Maier & Neustadt, P.C.

[57] ABSTRACT

A process for producing a composite article made of at least one hard component and at least one soft component, wherein the hard component contains a thermoplastic polyester containing non-aromatic C═C double bonds, and the soft component contains a vulcanizate, wherein the vulcanizate is produced by vulcanization of a rubber composition having the following components:

(i) 100 parts by weight of a rubber containing carboxyl or anhydride groups;
(ii) from 0 to 300 parts by weight of fillers;
(iii) from 1 to 10 parts by weight of peroxidic vulcanizers;
(iv) from 0 to 150 parts by weight of plasticizers, and
(v) more than 4 parts by weight of a difunctional or polyfunctional vulcanization activator of the formula $$R^1(-Z-CO-CR^2=CR^3R^4)_n,$$

wherein
$R^1$ is a divalent or higher-valent radical or a single bond, $R^2$ to $R^4$ are, independently of one another, hydrogen, alkyl, cycloalkyl or aryl, each having at most 20 carbon atoms; Z is alkyl, cycloalkyl, or aryl, each having at most 20 carbon atoms, S, NH or O, and n is a number greater than or equal to 2; in the presence of the hard component.

21 Claims, No Drawings

PROCESS FOR PRODUCING COMPOSITE ARTICLE MADE OF POLYESTERS AND ELASTOMERS

BACKGROUND OF THE INVENTION

1. Field of the Invention

The present invention relates to a process for producing composite articles made of at least one hard and at least one soft component, with the hard component being based on a thermoplastic polyester and the soft component being a vulcanizate, and to articles produced from the same.

2. Discussion of the Background

Frequently a single material cannot contribute all the properties that are demanded by an article. Such incompatible property combinations are, for example, simultaneous high strength and rubber elasticity or high hardness and stiffness on the one hand and skid resistance on the other hand.

To provide components with properties which cannot be contributed by a single material, they are often composed of parts of various materials. A necessary prerequisite for the functionality of such articles is strong adhesion between the various materials.

The bonding of rubbers and thermoplastics strongly to one another has been sought by various workers over the years and has been achieved in a variety of ways. Unfortunately, these previous methods have not been totally satisfactory.

Composite materials made of stiff thermoplastic and elastic rubber molding materials are customarily put together by adhesive bonding, screwing, rivetting, mechanical interlocking or with the use of a coupling agent. Recently, a process has been disclosed for producing a composite article comprising molding compositions based on polyphenylene ethers (PPE) and certain rubbers which can be vulcanized by sulfur or peroxide (cf. EP-A-0 196 407 and EP-A-0 315 749).

The bond strength values achieved here were considerable.

Now that these types of composite materials can be produced in principle, it is desirable to be able to produce composite materials whose thermoplastic component, besides having high geometric stability on heating, simultaneously has good solvent resistance, stability to weathering and excellent sliding friction behavior.

Although the above-noted known processes are linked to certain critical parameters, consideration could in principle be given to replacing the polyphenylene ether by other thermoplastics which better fulfill the specified requirements. However, it has been found that polyesters that fulfill the above requirements, do not allow satisfactory adhesion values to be achieved under the process conditions required. Therefore, the production of composites comprising thermoplastic polyesters and rubbers is difficult if not impossible according to the state of the art.

EP-A-0 375 867 describes a process for producing such composites in which the thermoplastic component comprises at least 30% of a reaction product of a thermoplastic polyester and a polyisocyanate. These reaction products have the disadvantage that at sufficiently high concentration of polyisocyanate they can only be injection-molded or extruded within a very narrow processing window.

EP-A-0 644 225 describes a process in which polyesters having an unimpaired processing behavior can be used in a composite with EP(D)M rubbers. This comprises using a hard component based on a thermoplastic polyester containing non-aromatic C=C double bonds, and, for the soft component, starting out from a rubber composition that is vulcanized in contact with the hard component under conventional vulcanization conditions and contains a particular functional silane.

However, if larger amounts of silanes are used in the rubber component, adhesion to the metal mold normally used in the vulcanization process can occur.

SUMMARY OF THE INVENTION

Accordingly, one object of the present invention is to provide a composite article having excellent adhesion between the component polymers.

A further object of the present invention is to provide a composite molding composition useful in preparing the composite article and having excellent processing characteristics.

These and other objects of the present invention have been satisfied by the discovery of a process for preparing a composite article, comprising vulcanizing a rubber composition in contact with a thermoplastic polyester containing non-aromatic C=C double bonds, wherein the rubber composition comprises the following components:

(i) 100 parts by weight of a rubber containing carboxyl or anhydride groups;

(ii) from 0 to 300 parts by weight of one or more fillers;

(iii) from 1 to 10 parts by weight of one or more peroxidic vulcanizers;

(iv) from 0 to 150 parts by weight of one or more plasticizers, and (v) more than 4 parts by weight of one or more difunctional or polyfunctional compounds of the formula

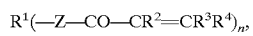

wherein $R^1$ is a divalent or higher-valent radical or a single bond, $R^2$ to $R^4$ are, independently of one another, hydrogen, alkyl, cycloalkyl or aryl, each having at most 20 carbon atoms; Z is alkyl, cycloalkyl, or aryl, each having at most 20 carbon atoms, S, NH or O, and n is a number greater than or equal to 2;

and the composite article produced therefrom, which provides excellent intercomponent adhesion in the composite.

DETAILED DESCRIPTION OF THE PREFERRED EMBODIMENTS

The present invention relates to a process for the preparation of compounds comprising a polyester having unimpaired processing behavior and a rubber. The present process comprises using a hard component based on a thermoplastic polyester containing non-aromatic C=c double bonds and, for the soft component, starting out from a rubber composition that is vulcanized in contact with the hard component under conventional vulcanization conditions and contains the following components:

(i) 100 parts by weight of a rubber containing carboxyl or anhydride groups, (ii) from 0 to 300 parts by weight of one or more fillers, (iii) from 1 to 10 parts by weight of one or more peroxidic vulcanizers, (iv) from 0 to 150 parts by weight of one or more plasticizers, and (v) more than 4 parts by weight of one or more difunctional or polyfunctional vulcanization activators of the formula

where
R¹ can be any divalent or higher-valent radical or a single bond, R² to R⁴ can be, independently, hydrogen, alkyl, cycloalkyl or aryl, each having at most 20 carbon atoms; Z can be alkyl, cycloalkyl, aryl, each having at most 20 carbon atoms, S, NH or O, and n is a number greater than or equal to 2, preferably from 2 to 4.

The use of compounds of the formula

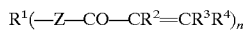

as vulcanization activators in rubber compounds is known per se. They enable a higher crosslinking density to be achieved in the rubber. However, their suitability as a coupling agent for a composite comprising a polyester and a rubber was not previously known. Although use is made in the abovementioned EP-A-0 375 867 of up to 4 parts by weight of vulcanization activators, such as ethylene glycol dimethacrylate or trimethylolpropane trimethacrylate, per 100 parts by weight of an EP(D)M rubber containing carboxyl groups, this is not sufficient to achieve a strong bond to the polyester without addition of a polyisocyanate. It was therefore surprising that use of larger amounts of these compounds in the present invention gives a bond which is sufficiently strong for the addition of polyisocyanate to the polyester and avoids the generally expected disadvantages.

The bonding mechanism between polyester and vulcanizate that is operative in the present invention is not yet known for certain.

The individual constituents of the hard and the soft components of the present invention will be described in more detail below.

The hard component, based on polyester, can be a polyester, a polyester molding composition, a polyester blend or a fiber composite material having a polyester matrix.

The thermoplastic polyester can be prepared using conventional methods, such as by transesterification or esterification of aromatic dicarboxylic acids having from 8 to 14 carbon atoms, or their esters, with suitable diols and subsequent polycondensation [cf. "Polymer Chemistry", Interscience Publ., New York, 1961, pp. 111–127; Kunststoffhandbuch, Volume VIII, C. Hanser Verlag, Munich, 1973 and Journal of Polymer Science, Part Al, 4, pp. 1851–1859 (1966)].

Suitable aromatic dicarboxylic acids include phthalic acid, isophthalic and terephthalic acid or esters thereof. The aromatic dicarboxylic acids can be partly replaced by aliphatic and/or cycloaliphatic dicarboxylic acids having up to 12 carbon atoms. Suitable examples include cyclohexane-1,4-dicarboxylic acid, adipic acid, sebacic acid, azelaic acid and decanedicarboxylic acid as saturated dicarboxylic acids and also maleic acid, fumaric acid, aconitic acid, itaconic acid, tetrahydrophthalic acid, tetrahydroisophthalic acid and tetrahydroterephthalic acid as unsaturated dicarboxylic acids.

Suitable diol components include
diols of the general formula HO—(CH₂)ₙ—OH wherein n is an integer from 2 to 12, such as ethylene glycol, propane-1,3-diol, butane-1,4-diol and hexane-1,6-diol, neopentyl glycol
1,4-di(hydroxymethyl)cyclohexane, and
unsaturated diols such as butene-1,4-diol.

A portion of these diols can be replaced by a poly (oxyalkylene)diol having a molecular weight of up to 3000, such as poly(oxyethylene) diol or poly(oxytetramethylene) diol, or by branched alkylenediols such as 2-methyl-1,4-butanediol.

The polyesters used according to the present invention preferably have a viscosity number J, in the range from 80 to 240 cm³/g, preferably from 120 to 200 cm³/g, as measured in accordance with DIN 53 728 at 25° C. on a solution in phenol/1,2-dichlorobenzene (50:50, w/w) at a concentration of 5 g/l.

In a preferred embodiment, the dicarboxylic acid component of the present polyester is based on terephthalic acid.

In a particularly preferred embodiment, use is made of polyesters having a dicarboxylic acid component based on terephthalic acid and a diol component which comprises from 0 to 99 mol % of butane-1,4-diol and from 1 to 100 mol % of butene-1,4-diol. In particular, the diol component preferably comprises at least 8 mol % and more preferably at least 15 mol % of butene-1,4-diol.

The desired double bond content of the polyester can of course be set by using a mixture of a polyester containing double bonds and a polyester free of double bonds.

For the purposes of the present invention, polyester molding compositions are polyester preparations corresponding to the prior art which have been used for improving the processing properties or for modifying the use properties of the polyester. Polyester molding compositions contain, for example, stabilizers, lubricants, fillers such as carbon black, graphite, metal flakes, titanium dioxide and zinc sulfide, reinforcers such as glass, carbon, aramid or metal fibers, plasticizers, dyes and/or flame retardants. The proportion of the reinforcers in the molding compositions can be up to 50% by weight, that of the flame retardants up to 20% by weight and that of all other additives up to a total of 10%, in each case based on the total molding composition.

For the purposes of the present invention, polyester blends are molding compositions which are composed of polyesters and other polymers and also the additives customary in polyester molding compositions. The polymer constituents can be soluble in one another or one polymer constituent can be dispersed in the other, or both can form interpenetrating networks with one another.

For the purposes of the present invention, any known polyester blend can be used. Suitable examples of such polyester blends include: blends containing polycarbonate, impact-modified polyesters which contain an impact modifier, such as MSA- or glycidyl methacrylate-modified rubbers, polyester/polyamide blends, blends of polyesters and polyolefins and also blends of polyesters and PMMA, PMMI, ABS, epoxy resins or block copolyether ester elastomers. Such systems are described, for example, in the following publications: Polymer Blends, Ed.: E. Martuscelli, R. Palumbo and M. Kryszewski, Plenum Press, New York, 1980; Polymer Alloys, Ed.: D. Klempner and K. C. Frisch, Plenum Press, New York, 1983; WO-A-87/00850; EP-A-0 037 547; EP-A-0 276 327 and H. Saechtling, Kunststoff-Taschenbuch, 25th edition, C. Hanser Verlag, Munich, Vienna, 1992.

The polyester content of the polyester blend is preferably at least 30% by weight, based on the sum of all polymer components.

For the purposes of the present invention, fiber composite materials having a polyester matrix are materials which are composed of uncut reinforcing fibers or fabrics thereof and a matrix polymer comprising a polyester, polyester molding composition or polyester blend.

Fiber composite materials having a matrix polymer of a polyester, polyester molding composition or polyester blend can be produced in various ways. For example, reinforcing fibers or reinforcing fabrics impregnated with polyesters, so called prepregs, can be consolidated by means of pressure and temperature to give sheets of laminate. It is also possible to process hybrid yarns of polyester fibers and reinforcing fibers, or films of the specified thermoplastics and fabrics of reinforcing fibers under pressure and temperature to give composite materials. Suitable reinforcing fibers include glass fibers, carbon fibers and aramid fibers.

The rubber composition used in the process of the present invention comprises a rubber containing carboxyl or anhydride groups which can be prepared in a conventional manner by carboxylation with unsaturated acids or acid derivatives such as maleic acid or maleic anhydride (cf. for example US-A 40 10 223). It is also possible to prepare rubbers by copolymerization with unsaturated acids such as acrylic acid. Suitable rubbers include any conventional rubber containing carboxyl or anhydride groups.

A general lower limit for the carboxyl content or the acid number cannot be given, since this differs according to the type of rubber used and according to the type and amount of the compound $R^1(-Z-CO-CR^2=CR^3R^4)_n$ used. The lower limit should therefore be regarded as the minimum value at which the effects of the invention are established. This value can be determined for the system selected in each case by a few routine experiments.

The rubber used as the soft component can be, for example, an EP(D)M rubber, an SB rubber (such as E-SBR or S-SBR), BR, NR, IR, IIR, CIIR, BIIR, NBR, CR, a styrene-containing block copolymer and/or a polyalkenylene.

EP(D)M rubbers are conventional rubbers which are prepared by polymerization of a mixture of ethylene and propylene and, if desired, a diene in the presence of a Ziegler-Natta catalyst.

The EPDM rubber is prepared by polymerization of a mixture of more than 25% by weight of ethylene,
more than 25% by weight of propylene and
up to 10% by weight, in particular from 1 to 3% by weight, of a preferably unconjugated diene such as bicyclo[2.2.1]heptadiene, 1,4-hexadiene, dicyclopentadiene and, in particular, 5-ethylidenenorbornene.

The SB rubber can be either E-SBR or S-SBR having a styrene content up to a maximum of about 40 percent by weight.

E-SBR is prepared by conventional methods, such as polymerization in emulsion, while S-SBR is prepared by conventional polymerization in solution.

Butadiene rubber (BR) can be prepared conventionally, such as by polymerization using an Li or Co catalyst. The type of linkage (1,2 vs 1,4) here has no influence on the suitability of the BR for the present invention.

Natural rubber (NR) is usually used in the cis-1,4 configuration. However, for the purposes of the present invention, the trans-1,4 configuration is also suitable.

Isoprene rubber (IR) can be used regardless of whether it has been prepared, for example, using a Ti or Li catalyst. The cis-1,4/trans-1,4 or 1,2 and 3,4 content has no influence on the adhesion properties of the present compositions.

Isobutene-isoprene rubber (IIR) can be used as such or in its halogenated form (CIIR or BIIR=chloro and bromo derivatives, respectively).

Nitrile rubber (NBR) is obtained by polymerization of butadiene and acrylonitrile in a mass ratio of from about 51:48 to 82:18. Its preparation is virtually exclusively carried out in aqueous emulsion. The resulting emulsions are, for the purposes of the present invention, worked up to give a solid rubber.

Chloroprene rubber (CR) is usually prepared by free-radical emulsion polymerization. The monomer is here incorporated into the polymer in different structural forms. The cis-1,4/trans-1,4 or 1,2 and 3,4 content or the proportion of head/head and head/tail linkage has no influence on the adhesion properties of the present composition.

Styrene-containing block copolymers which can be used include all known types based on styrene/butadiene or styrene/isoprene. Examples of such copolymers are SB, SBS and SIS and also corresponding types containing a larger number of blocks. The styrene containing block copolymers used in the present invention can be linear or branched. Furthermore, the soft phase can be hydrogenated. The corresponding block copolymers are also described as styrene-ethylene-butylene-styrene block copolymers (SEBS).

Polyalkenylenes are prepared by ring-opening or ring-expanding polymerization of cycloalkenes [see K. J. Ivin, T. Saegusa, "Ring-opening Polymerisation", Vol. 1, Elsevier Appl. Sci. Publishers, London, in particular pages 121 to 183 (1984)). Of these, preference is given to polyoctenylenes (cf. A. Dräxler, Kautschuk+Gummi, Kunststoff 1981, pages 185 to 190). Polyoctenylenes having different proportions of cis and trans double bonds and also different molecular weights are obtainable by methods known in the literature.

For the purposes of the present invention, preference is given to using a rubber which comprises from 30 to 100 parts by weight of an EP(D)M rubber and from 70 to 0 parts by weight of other rubbers.

Preferred carboxylated EPM rubbers are produced by Exxon Chemical GmbH, Cologne under the name EXXELOR VA 1801, VA 1803 or VA 1806.

A preferred carboxylated EPDM rubber is maleic anhydride-modified BUNA HÜLS AP from Hüls AG, Marl (experimental product X 4496).

Preferred NBR rubbers containing carboxyl groups are sold by Goodyear Tire & Rubber Company, Akron, Ohio, USA, under the name CHEMIGUM NX 775 and by Zeon Europe GmbH, Dusseldorf, Germany under the names NIPOL 1472 and NIPOL 1072.

The preparation of functionalized rubbers, by a process such as by compounding of the rubber with maleic anhydride at elevated temperature and, if desired, in the presence of free-radical initiators, is known in the art.

The functionalized rubbers which can be used according to the present invention do not, however, necessarily have to be prepared prior to their use in the present composition. They can also be prepared in situ during vulcanization. For this purpose, a commercial, non-functionalized rubber is used together with a compound which contains at least one C=C double bond and/or C≡C triple bond and at least one carboxyl or anhydride group. For example, maleic anhydride, monoalkyl maleates, fumaric acid, tetrahydrophthalic anhydride, acrylic acid, methacrylic acid, itaconic acid, sorbic acid, oleic acid, linoleic acid, propionic acid, phenylpropiolic acid, adducts of maleic anhydride with linoleic acid, adducts of maleic anhydride with low-molecular-weight polybutadiene or corresponding adducts with low-molecular-weight polyoctenamer can be used in this embodiment to functionalize the rubber in situ during the vulcanization step. Any desired rubber can be used.

A further embodiment comprises using a mixture of a functionalized rubber and a non-functionalized rubber.

Suitable fillers include any materials which are customarily used in rubbers, such as carbon black, silica, silicates, calcium carbonate, zinc oxide and talc. When using highly active fillers, an increased amount of the compound $R^1(-Z-CO-CR^2=CR^3R^4)_n$ is needed to provide the requisite adhesion in the resulting composite.

Preferred plasticizers include naphthenic and/or aliphatic oils or special plasticizers customary in rubber technology, such as fatty acid esters of polyalcohols or thioethers. These plasticizers can be used in an amount of preferably up to 50 parts by weight, based on 100 parts by weight of rubber.

Suitable peroxidic vulcanizers are those peroxides for crosslinking rubbers which are known to those skilled in the art, such as 2,5-dimethyl-2,5-bis(tert-butylperoxy)hexane, dicumyl peroxide, 4,4-di-tert-butylperoxy-n-butyl valerate, 1,1-di-tert-butylperoxy-3,3,5-trimethylcyclohexane and bis (tert-butylperoxyisopropyl)benzene. Details of the use of peroxidic vulcanizers can be obtained from the company brochure "Rubbery Chemical-Crosslinking-Peroxides" from Akzo-Chemie (Publication date: April 1985), the contents of which are hereby incorporated by reference.

The present rubber compositions can also contain further additives, such as vulcanization retarders, aging inhibitors, processing aids, mold release agents and/or blowing agents. In general, these further additives make up at most 50 parts by weight, based on 100 parts by weight of rubber. The preparation of such compounds is described, for example, by F. W. Barrow in "Rubber Compounding", published in 1988 by Marcel Dekker Inc., New York and Basle, or by W. Kleemann in "Mischungen für die Elastverarbeitung", published in 1982 (VEB Deutscher Verlag für Grundstoffindustrie).

Among the compounds $R^1(-Z-CO-CR^2=CR^3R^4)_n$, compounds having Z=0 are particularly preferred because of their ready availability. Preferred examples include 1,4-butanediol dimethylacrylate (BDMA), 1,3-butanediol dimethacrylate, 1,2-ethanediol diacrylate, 1,2-ethanediol dimethacrylate and trimethylolpropane trimethacrylate.

Preference is given to using at most 12 parts by weight of the compounds $R^1(-Z-CO-CR^2=CR^3R^4)_n$, based on 100 parts by weight of the rubber.

The composite of the present invention comprises a hard component based on polyester and an elastomeric/rubber component. The present composite is produced by vulcanization of the rubber compound in contact with the hard component.

The present articles made of (i) a polyester, polyester molding composition or polyester blend and (ii) a rubber compound can be produced in one or two stages. Articles made of a fiber composite material and a rubber compound are produced in two stages.

In the two-stage process, the stiff shaped part is first produced by a procedure such as injection molding, extrusion or consolidation of prepregs. In a second step, the rubber compound (preformed, if desired) is applied to the stiff shaped part and is exposed to the vulcanization conditions of the rubber. The application of the rubber to the stiff shaped part can be carried out by pressing, injection molding or extrusion.

In the two-stage injection molding process, the procedure is similar to that used in the two-stage production of two-color injection molded parts. The insert part used is a shaped part of the specified hard materials. The barrel and screws of the injection molding machine are designed in a manner known for rubber processing and the mold can be heated to the vulcanization temperature of the rubber used. If external mold-release agents are used, care has to be taken to ensure that they do not get into the interface of the materials, since they can impair adhesion in the composite.

In the steps of applying the rubber and vulcanizing the rubber by the two-stage extrusion process, for example, a profile produced in the first stage from the thermoplastic, such as a pipe, is enveloped with the rubber composition and is vulcanized with or without application of pressure. Sheets, nonwovens, woven fabrics and ropes are processed in a corresponding manner.

The single-stage injection molding process is carried out in a manner similar to the conventional single stage two-color injection molding process. In this embodiment, one injection molding machine is equipped for thermoplastic processing, while a second one is equipped for rubber processing. The mold is heated to the prescribed vulcanization temperature, which should lie below the solidification temperature of the polyester, the polyester molding composition or the polyester blend used.

The optimum vulcanization conditions depend on the rubber mixture selected, in particular on its vulcanization system, and the configuration of the shaped part. The conditions used for vulcanizing are readily determined by those of skill in the art based on the rubber chosen, since the compound $R^1(-Z-CO-CR=CR^2R^3)_n$ added does not significantly affect the vulcanization conditions.

Suitable composition temperatures of the rubber mixture in the barrel are generally in the range from 40° to 80° C., preferably from 66° to 70° C.

Suitable vulcanization temperatures depend on the softening temperatures of the insert parts. They are generally in the range from 140° to 200° C. If the softening ranges of the insert parts allow, the temperatures are selected in an upper range of from 170° to 190° C. The vulcanization times depend not only on the rubber mixture but also on the vulcanization temperatures and the geometry of the parts. They are generally between 30 seconds and 30 minutes. Lower temperatures and thicker rubber parts require longer times.

The process of the present invention and also the composites produced thereby have the following advantages:

The composite is preferably produced in a few minutes.

The polyesters used in the composite system have high geometric stability on heating, good solvent resistance, excellent sliding friction behavior, a water absorption that is small and can be used without problems in an exterior application.

The composite is so strong that testing results in a cohesion fracture in the rubber, but not in a separation of the phase interface.

Having generally described this invention, a further understanding can be obtained by reference to certain specific examples which are provided herein for purposes of illustration only and are not intended to be limiting unless otherwise specified.

EXAMPLES

The following materials were used for the preparation of the rubber mixture:

EXXELOR VA 1803, a maleic anhydride(1%)-modified EPM rubber from Exxon Chemical, Cologne. The properties of the products are given in the technical information literature of Exxon Chemical.

Sillitin Z86: Aluminum silicate from Hoffmann Mineral, Neuburg/Donau having a specific surface area of about 14 m²/g.

ZnO RS: Zinc oxide from Carl Arnsberger, Cologne

Vulkanox HS: Polymerized 2,2,4-trimethyl-1,2-dihydroquinoline from Rhein-Chemie, Rheinau BDMA: Butanediol dimethacrylate, 75% on calcium silicate from Lehmann & Voss Perkadox 14/40: Bis-tert-butylperoxyisopropylbenzene, 40% on chalk and $SiO_2$ from Akzo Chemicals, Düren Sunpar 2280: Paraffinic (73%)-naphthenic (23%)-aromatic (4%) oil from Sun Oil, Belgium.

The polyester materials used were the following molding compositions:

Type A corresponds to a normal polybutylene terephthalate, VESTODUR 1000 from Hüls AG, D-45764 Marl, having a solution viscosity J of 108 $cm^3/g$.

Type B corresponds to polybutylene terephthalate having a copolycondensed content of 20 mol % of 1,4-butene-2-diol, based on the total diol component, and a solution viscosity J of 106 $cm^3/g$.

Type C corresponds to polybutylene terephthalate having a copolycondensed content of 30 mol % of 1,4-butene-2-diol, based on the total diol component, and a solution viscosity J of 108 $cm^3/g$.

Preparation of the Rubber Mixtures

The preparation of the individual rubber mixtures I to IV was carried out in an instrumented laboratory batch compounder (from Haake). 28.57 g of the rubber were first compounded at an initial temperature of 60° C. and a revolution rate of 64 rpm. Over a period of about 5 minutes, the oil given in Table 1, the filler given in Table 1, 1.43 g of ZnO RS and 0.57 g of Vulkanox HS were incorporated and the mixture was homogenized for a further three minutes. During this time, the temperature rose to about 110° C. This premix was subsequently stored at room temperature for >24 hours. Subsequently, under the same conditions (60° C. initial temperature, 64 rpm), 1.71 g of Perkadox 14/40 and the amount of BDMA given in Table 1 were incorporated homogeneously over a period of about four minutes. The temperature of the mixture here did not rise above 130° C.

TABLE 1

| Mixture | EXXELOR VA 18703 [g] | Sillitin Z86 [g] | Sunpar 2280 [g] | BDMA [g] |
|---|---|---|---|---|
| I | 28.57 | 22.86 | 5.71 | — |
| II | 28.57 | 22.86 | 5.71 | 0.43 |
| III | 28.57 | 22.86 | 5.71 | 1.23 |
| IV | 28.57 | 22.86 | 5.71 | 2.03 |

Production of the Composites

Test specimens (100×100×4 mm) were produced from polyesters A–C by injection molding at a barrel temperature of 250° C. A sheet was subsequently laid in a mold made of V2A steel (100×100×8 mm) and covered on one side with a 20 mm wide piece of PTFE film. The sheet thus prepared was pressed in a hydraulic press (Schwabenthan—Polystat 20T) for 20 minutes at 180° C. and 200 bar.

Testing of Adhesion in the Composite

The testing of the adhesion in the composite between the polyester material and vulcanized rubber was carried out by means of a peeling test following DIN 53 531. The rubber part, which was kept separate from the polyester material during vulcanization by means of the Teflon film, was then fixed in such a way that in the peeling tests the rubber strip was pulled off perpendicular to the thermoplastic surface. The results are shown in Table 2, with the assessment having been carried out as follows:

H Adhesion (fracture in rubber, i.e. cohesive fracture; high separation force)

Non-adhesion (fracture in the interface between rubber and polyester, i.e. adhesive fracture; low to very low separation force)

TABLE 2

| | Rubber | Polyester | | |
|---|---|---|---|---|
| Example | mixture | A | B | C |
| 1 (comp.) | I | — | — | — |
| 2 (comp.) | II | — | — | — |
| 3 | III | — | H | H |
| 4 | IV | — | H | H |

This application is based on German Patent Application 195 39 127.6, filed with the German Patent Office on Oct. 20, 1995, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A composite article comprising at least one hard component and at least one soft component, wherein the hard component comprises a thermoplastic polyester containing non-aromatic C=C double bonds, and the soft component comprises a vulcanizate, wherein the vulcanizate is produced by vulcanization of a rubber composition comprising the following components:

(i) 100 parts by weight of a rubber containing carboxyl or anhydride groups;

(ii) from 0 to 300 parts by weight of one or more fillers;

(iii) from 1 to 10 parts by weight of one or more peroxidic vulcanizers;

(iv) from 0 to 150 parts by weight of one or more plasticizers, and (v) more than 4 parts by weight of one or more difunctional or polyfunctional vulcanization activate of the formula

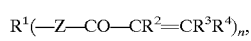

wherein $R^1$ is a divalent or higher-valent radical or a single bond, $R^2$ to $R^4$ are, independently of one another, hydrogen, alkyl, cycloalkyl or aryl, each having at most 20 carbon atoms; Z is alkyl, cycloalkyl, or aryl, each having at most 20 carbon atoms, S, NH or O and n is a number greater than or equal to 2.

2. The article as claimed in claim 1, wherein n is a number from 2 to 4.

3. The article as claimed in claim 1, wherein the hard component is a polyester, a polyester molding composition, a polyester blend or a fiber composite material having a polyester matrix.

4. The article as claimed in claim 1, wherein the thermoplastic polyester is prepared from terephthalic acid and at least one diol or polyol.

5. The article as claimed in claim 4, wherein said at least one diol or polyol comprises from 0 to 99 mol % of butane-1,4-diol and from 1 to 100 mol % of butene-1,4-diol.

6. The article as claimed in claim 5, wherein said at least one diol or polyol comprises at least 8 mol % of butene-1,4-diol.

7. The article as claimed in claim 5, wherein said at least one diol or polyol comprises at least 15 mol % of butene-1,4-diol.

8. The article as claimed in claim 1, wherein the rubber containing carboxyl or anhydride groups is prepared in situ during vulcanization by using a non-functionalized rubber together with a compound which contains at least one C=C double bond, at least one C≡C triple bond or both and at least one carboxyl or anhydride group.

9. The article as claimed in claim 1, wherein the rubber is a member selected from the group consisting of EP(D)M rubbers, E-SBR, S-SBR, BR, NR, IR, IIR, CIIR, BIIR, NBR, CR, styrene-containing block copolymers and polyalkenylenes.

10. The article as claimed in claim 1, wherein the rubber comprises from 30 to 100 parts by weight of an EP(D)M rubber and from 70 to 0 parts by weight of other rubbers.

11. The article as claimed in claim 1, wherein the component (v) is present in an amount of at most 12 parts by weight, based on 100 parts by weight of rubber.

12. The article as claimed in claim 1, wherein the rubber composition further comprises one or more members selected from the group consisting of vulcanization retarders, aging inhibitors, processing aids, mold release agents and blowing agents.

13. A process for preparing a composite article, comprising vulcanizing a rubber composition in contact with a thermoplastic polyester containing non-aromatic C=C double bonds, wherein said rubber composition comprises the following components:

(i) 100 parts by weight of a rubber containing carboxyl or anhydride groups;

(ii) from 0 to 300 parts by weight of one or more fillers;

(iii) from 1 to 10 parts by weight of one or more peroxidic vulcanizers;

(iv) from 0 to 150 parts by weight of one or more plasticizers, and (v) more than 4 parts by weight of one or more difunctional or polyfunctional vulcanization activators of the formula

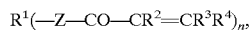

wherein $R^1$ is a divalent or higher-valent radical or a single bond, $R^2$ to $R^4$ are, independently of one another, hydrogen, alkyl, cycloalkyl or aryl, each having at most 20 carbon atoms; Z is alkyl, cycloalkyl, or aryl, each having at most 20 carbon atoms, S, NH or O, and n is a number greater than or equal to 2.

14. The process as claimed in claim 13, wherein n is a number from 2 to 4.

15. The process as claimed in claim 13, wherein the composite is prepared in either a single-stage or a two-stage process, wherein the rubber composition has a vulcanization temperature in a range from 140° to 200° C.

16. The process as claimed in claim 13, wherein the thermoplastic polyester is a polyester, a polyester molding composition, a polyester blend or a fiber composite material having a polyester matrix.

17. The process as claimed in claim 13, wherein the thermoplastic polyester is prepared from terephthalic acid and at least one diol or polyol.

18. The process as claimed in claim 17, wherein said at least one diol or polyol comprises from 0 to 99 mol % of butane-1,4-diol and from 1 to 100 mol % of butene-1,4-diol.

19. The process as claimed in claim 13, wherein the rubber containing carboxyl or anhydride groups is prepared in situ during vulcanization by using a non-functionalized rubber together with a compound which contains at least one C=C double bond, at least one C≡C triple bond or both and at least one carboxyl or anhydride group.

20. The process as claimed in claim 13, wherein the rubber is a member selected from the group consisting of EP(D)M rubbers, E-SBR, S-SBR, BR, NR, IR, IIR, CIIR, BIIR, NBR, CR, styrene-containing block copolymers and polyalkenylenes.

21. The process as claimed in claim 13, wherein said vulcanization is carried out in a mold.

* * * * *